(12) United States Patent
Okamura et al.

(10) Patent No.: US 11,100,727 B2
(45) Date of Patent: Aug. 24, 2021

(54) COMMUNICATION SYSTEM FOR WORKING MACHINE

(71) Applicant: KUBOTA CORPORATION, Osaka (JP)

(72) Inventors: Seiichi Okamura, Osaka (JP); Kanta Takechi, Osaka (JP); Daisuke Naito, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/232,662

(22) Filed: Dec. 26, 2018

(65) Prior Publication Data

US 2019/0130662 A1 May 2, 2019

Related U.S. Application Data

(63) Continuation of application No. PCT/JP2017/036727, filed on Oct. 11, 2017.

(30) Foreign Application Priority Data

Oct. 12, 2016 (JP) .............................. JP2016-201263

(51) Int. Cl.
| | |
|---|---|
| *G07C 5/08* | (2006.01) |
| *G07C 5/00* | (2006.01) |
| *G07C 5/02* | (2006.01) |
| *B60K 35/00* | (2006.01) |
| *G06K 7/10* | (2006.01) |
| *G06K 19/07* | (2006.01) |
| *H04Q 9/00* | (2006.01) |
| *A01B 51/04* | (2006.01) |

(Continued)

(52) U.S. Cl.
CPC .............. *G07C 5/008* (2013.01); *A01B 51/04* (2013.01); *B60K 35/00* (2013.01);
(Continued)

(58) Field of Classification Search
CPC ........ G07C 5/008; G07C 5/02; G07C 5/0825; H04Q 9/00; H04Q 2209/47;
(Continued)

(56) References Cited

U.S. PATENT DOCUMENTS 9,374,562 B2 * 6/2016 Trombley ............... B60R 1/003
9,506,774 B2 * 11/2016 Shutko ............... G01C 21/3647
(Continued)

FOREIGN PATENT DOCUMENTS

| CN | 204124103 U | 1/2015 |
| JP | 10 159599 A | 6/1998 |

(Continued)

OTHER PUBLICATIONS

European Search Report in European Application No. 17860040.9, dated Nov. 6, 2019.

*Primary Examiner* — Masud Ahmed
(74) *Attorney, Agent, or Firm* — Greenblum & Bernstein, P.L.C.

(57) ABSTRACT

A communication system for a working machine includes: a first communication device configured to be attached to a working device detachably disposed on a vehicle body and to transmit, to an outward, device information relating to the working device as a broadcasting signal; and a receiving device having a receiving part configured to receive the device information transmitted in the broadcasting signal.

17 Claims, 17 Drawing Sheets

(51) Int. Cl.
 *H04L 12/40* (2006.01)
 *A01B 76/00* (2006.01)
(52) U.S. Cl.
 CPC ..... *G06K 7/10366* (2013.01); *G06K 19/0723* (2013.01); *G07C 5/02* (2013.01); *G07C 5/0825* (2013.01); *H04Q 9/00* (2013.01); *A01B 76/00* (2013.01); *H04L 2012/40273* (2013.01)
(58) Field of Classification Search
 CPC ............ H04Q 2209/43; H04Q 2209/40; A01B 51/04; A01B 76/00; A01B 59/04; B60K 35/00; G06K 7/10366; G06K 19/0723; H04L 2012/40273; G08C 17/02
 USPC .......................................................... 701/41
 See application file for complete search history.

(56) References Cited

U.S. PATENT DOCUMENTS

| | | | | |
|---|---|---|---|---|
| 9,854,209 | B2 * | 12/2017 | Aich | ....................... H04N 7/181 |
| 10,414,221 | B2 * | 9/2019 | Burkhart | ................... B60D 1/06 |
| 2011/0018231 | A1 * | 1/2011 | Collenberg | .............. B60D 1/06 |
| | | | | 280/448 |
| 2011/0279253 | A1 | 11/2011 | Suda et al. | |
| 2012/0089304 | A1 | 4/2012 | Hamilton et al. | |
| 2012/0185131 | A1 * | 7/2012 | Headley | ................. B60D 1/245 |
| | | | | 701/41 |
| 2016/0055688 | A1 | 2/2016 | Miura et al. | |
| 2019/0001827 | A1 * | 1/2019 | Perez Vallejo | ........ H04W 4/046 |
| 2019/0257576 | A1 * | 8/2019 | Pankaj | ................... B65G 1/137 |

FOREIGN PATENT DOCUMENTS

| | | |
|---|---|---|
| JP | 2003116304 | 4/2003 |
| JP | 2004024052 | 1/2004 |
| JP | 2006223105 | 8/2006 |
| JP | 2006296262 A | 11/2006 |
| JP | 2006304737 | 11/2006 |
| JP | 2015 69418 A | 4/2015 |
| JP | WO2015045910 | 4/2015 |
| KR | 101477993 | 1/2015 |
| WO | WO2016000893 | 1/2016 |

* cited by examiner

FIG.5A

| 1st operation info. | | |
|---|---|---|
| Engine rev. speed(rpm) | Speed(km/h) | PTO rev. speed (rpm) |
| 1900 | 1.35 | 950 |
| 1920 | 1.36 | 970 |
| 1910 | 1.34 | 960 |
| . | . | . |
| . | . | . |
| . | . | . |

FIG.5B

| Identifying info. | 2nd operation info. |
|---|---|
| | Fertilizer amount(kg) |
| K-1150 | 0.02 |
| K-1150 | 0.02 |
| K-1150 | 0.01 |
| . | . |
| . | . |
| . | . |

FIG.5C

| Identifying info. | 1st operation info. | | 2nd operation info. |
|---|---|---|---|
| | Speed(km/h) | PTO rev. speed (rpm) | Fertilizer amount (kg) |
| K-1150 | 1.35 | 950 | 0.02 |
| K-1150 | 1.36 | 970 | 0.02 |
| K-1150 | 1.34 | 960 | 0.01 |
| . | . | . | . |
| . | . | . | . |
| . | . | . | . |

FIG.7A

| Working results | | |
|---|---|---|
| Identifying Info. | Position info. | |
| | Latitude | Longitude |
| K-1150 | 34.558877 | 135.471009 |
| K-1150 | 34.558879 | 136.471009 |
| K-1150 | 36.558881 | 137.471009 |
| . . . | . . . | . . . |

FIG.7B

| Working results ||||||
|---|---|---|---|---|---|
| Identifying Info. | 1st operation info. ||| Position info. ||
| | Engine rev. speed (rpm) | Speed (km/h) | PTO rev. speed (rpm) | Latitude | Longitude |
| K-1150 | 1900 | 1.35 | 950 | 34.558877 | 135.471009 |
| K-1150 | 1920 | 1.36 | 970 | 34.558879 | 136.471009 |
| K-1150 | 1910 | 1.34 | 960 | 36.558881 | 137.471009 |
| . | . | . | . | . | . |
| . | . | . | . | . | . |
| . | . | . | . | . | . |

FIG.7C

| Working results ||||||| 
| Identifying Info. | 1st operation info. ||| 2nd operation info. | Position info. ||
| | Engine rev. speed (rpm) | Speed (km/h) | PTO rev. speed (rpm) | Fertilizer (kg) | Latitude | Longitude |
|---|---|---|---|---|---|---|
| K-1150 | 1900 | 1.35 | 950 | 0.02 | 34.558877 | 135.471009 |
| K-1150 | 1920 | 1.36 | 970 | 0.02 | 34.558879 | 136.471009 |
| K-1150 | 1910 | 1.34 | 960 | 0.01 | 36.558881 | 137.471009 |
| . | . | . | . | . | . | . |
| . | . | . | . | . | . | . |

FIG.9A

| Time | ID info. | 1st operation time | 2nd operation time | Accumulated operation time |
|---|---|---|---|---|
| 8:25 | K-1150 | 3hours | — | 3hours |
| 8:26 | K-1150 | | | |
| 8:27 | K-1150 | | | |
| 8:28 | K-1150 | | | |
| 8:29 | K-1150 | | | |
| 8:30 | K-1150 | | | |
| ⋮ | ⋮ | | | |
| 11:25 | K-1150 | | | |
| 13:00 | K-1150 | — | 3hours | 6hours |
| 13:01 | K-1150 | | | |
| 13:02 | K-1150 | | | |
| 13:03 | K-1150 | | | |
| 13:04 | K-1150 | | | |
| 13:05 | K-1150 | | | |
| ⋮ | ⋮ | | | |
| 15:00 | K-1150 | | | |

FIG.9B

| | Time | ID info. | ID info. | 1st operation time | 2nd operation time | Accumulated operation time |
|---|---|---|---|---|---|---|
| T1 | 8:25 | K-1150 | K-1341 | | | |
| | 8:26 | K-1150 | K-1341 | | | |
| | 8:27 | K-1150 | K-1341 | | | |
| | 8:28 | K-1150 | — | 3hours | — | 3hours |
| | 8:29 | K-1150 | — | | | |
| | 8:30 | K-1150 | — | | | |
| T2 | ⋮ | ⋮ | — | | | |
| T3 | 11:25 | K-1150 | — | | | |
| | 13:00 | K-1150 | — | | | |
| | 13:01 | K-1150 | — | | | |
| | 13:02 | K-1150 | — | | | |
| | 13:03 | K-1150 | — | — | 3hours | 6hours |
| | 13:04 | K-1150 | — | | | |
| | 13:05 | K-1150 | — | | | |
| T4 | ⋮ | ⋮ | — | | | |
| | 15:00 | K-1150 | — | | | |

COMMUNICATION SYSTEM FOR WORKING MACHINE

CROSS-REFERENCE TO RELATED APPLICATIONS

The present application is a continuation application of International Application No. PCT/JP 2017/036727, filed Oct. 11, 2017, which claims priority to Japanese Patent Application No. 2016/201263, filed Oct. 12, 2016. The content of this application is incorporated herein by reference in their entirety.

BACKGROUND OF THE INVENTION

Field of the Invention

The present invention relates to a communication system for a working machine.

Description of Related Art

Conventionally, the technique disclosed in Japanese Unexamined Patent Application Publication No. 2004-024052 is known as a work device (an instrument) such as a tilling device connected to the rear portion of a tractor. The tractor disclosed in Japanese Unexamined Patent Application Publication No. 2004-024052 includes a link mechanism (three-point link mechanism) provided at a rear portion of a vehicle body and a tilling device detachable via a link mechanism.

SUMMARY OF THE INVENTION

A communication system for a working machine includes: a first communication device configured to be attached to a working device detachably disposed on a vehicle body and to transmit, to an outward, device information relating to the working device as a broadcasting signal; and a receiving device having a receiving part configured to receive the device information transmitted in the broadcasting signal.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5A is a view illustrating an example of first operational information according to the second embodiment;

FIG. 5B is a view illustrating an example of second operational information according to the second embodiment;

FIG. 5C is an explanation view explaining a manner to relate the first operational information, the second operational information, and identifying information to each other according to the second embodiment;

FIG. 7A is a view illustrating a case where identifying information and positional information are stored as a working result according to the third embodiment;

FIG. 7B is a view illustrating a case where first operational information, identifying information, and positional information are stored as a working result according to the third embodiment;

FIG. 7C is a view illustrating a ease where the first operational information, the second operational information, the identifying information, and the positional information are stored as the working result according to the third embodiment;

FIG. 9A is an explanation view illustrating a manner to obtain an accumulated operational time according to the fourth embodiment;

FIG. 9B is an explanation view illustrating a manner to obtain the accumulated operational time other than the manner of FIG. 9A, according to the fourth embodiment;

DESCRIPTION OF THE EMBODIMENTS

Figure 1:
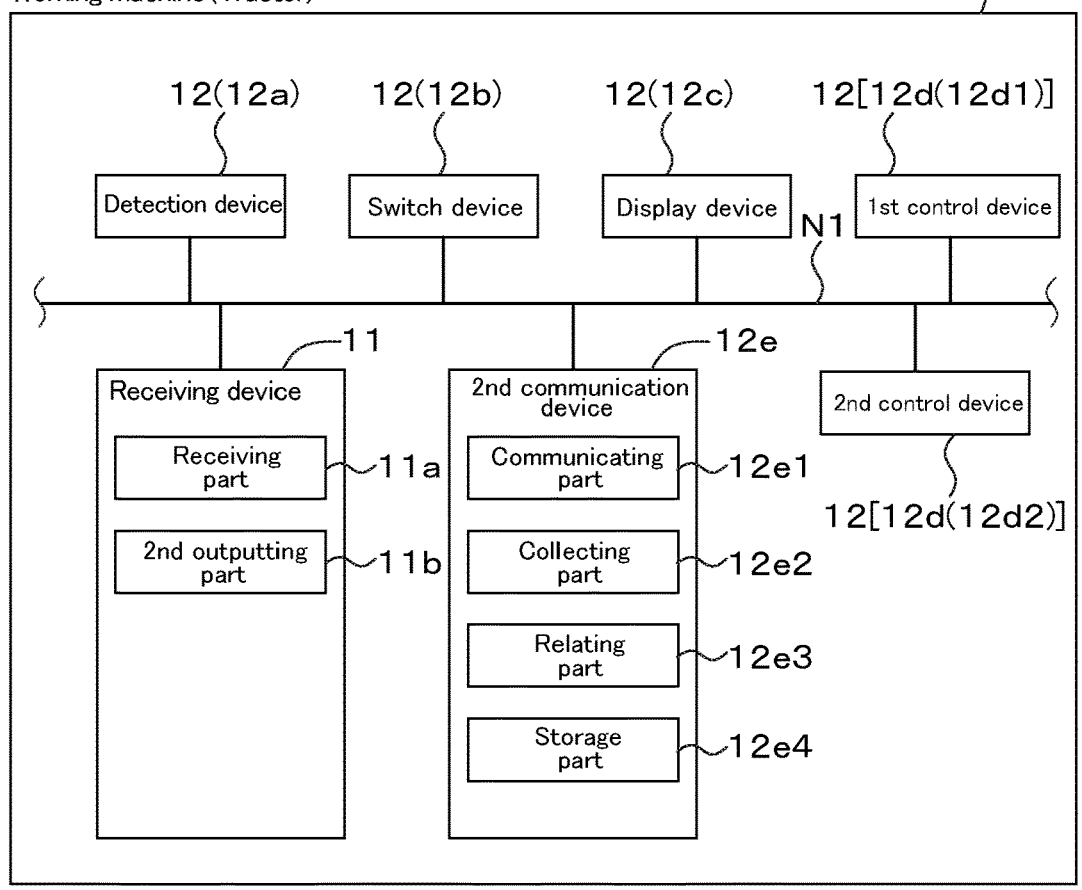
FIG. 1 is a view illustrating an outline of a communication system for a working machine according to a first embodiment of the present invention.
Figure 1:
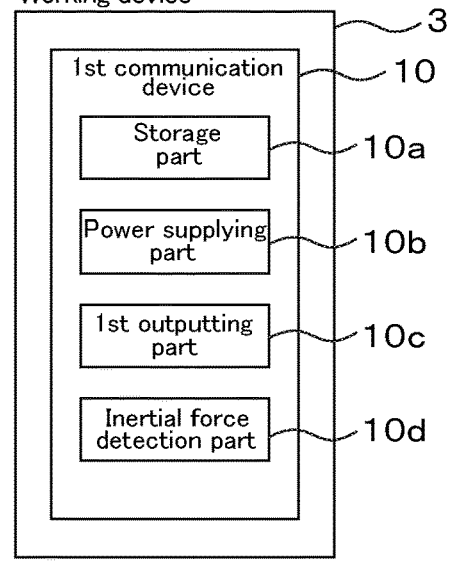
Figure 1:
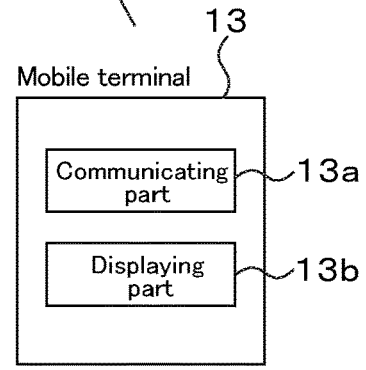

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, embodiments of the present invention will be described with reference to the drawings.

First Embodiment

FIG. 1 shows the entire communication system of the working machine. The working machine is a tractor provided with a working device, an agricultural machine such as a combine and a rice transplanter, a construction machine such as a backhoe and a loader, and the like.

First, the working machine will be described.

Figure 11:
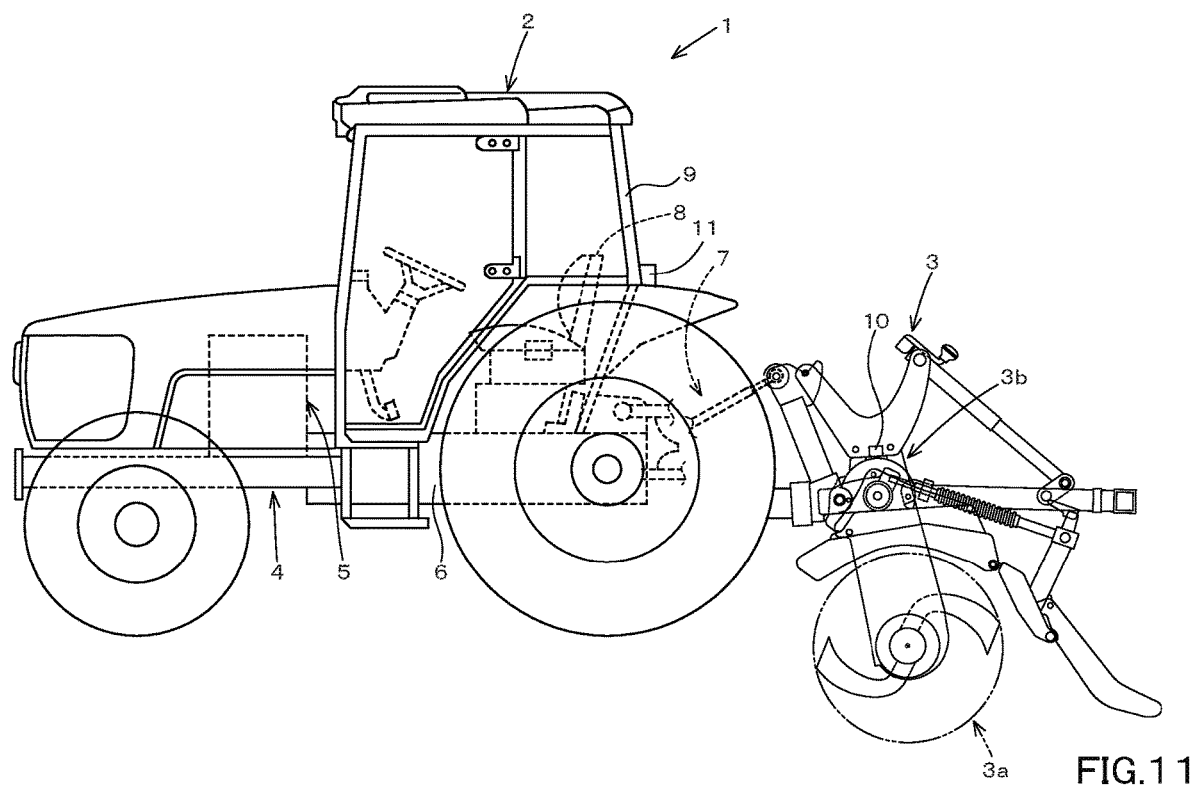
FIG. 11 is a whole view of the working machine in which a cultivating device is coupled to the tractor according to the embodiments.

FIG. 11 shows the overall view of the working machine 1. The work machine 1 includes a work vehicle 2 and a working device 3. The working vehicle 2 is a vehicle capable of pulling the working device 3 and is, for example, a tractor.

For convenience of the explanation, it is assumed that the front side (the left side in FIG. 11) of the driver seated in the operator seat 8 provided in the tractor 2 is the front, the rear side of the operator (the right side in FIG. 11) is the rear, the left side of the operator (the front surface side in FIG. 11) is the left, and the right side of the operator (the back surface side in FIG. 11) is the right.

As shown in FIG. 11, the tractor 2 includes a vehicle (vehicle body) 4 having wheels, a prime mover 5 such as a diesel engine (referred to as an engine), and a transmission 6 for changing speeds. It should be noted that the prime mover 5 may be a motor, or may be both a motor and an engine. A cabin 9 is provided behind the prime mover 5. In the cabin 9, the operator seat 8 is provided.

On the rear portion of the vehicle body 2, a connecting portion 7 such as a three-point link mechanism is provided. The working device 3 is detachable from the connecting portion 7. Power from the prime mover 5 is transmitted to the working device 3 via the PTO shaft. The working device 3 is a tilling device for cultivating, a fertilizer spraying device for spraying fertilizer, an agricultural chemical spraying device for spraying agricultural chemicals, a harvesting device for harvesting, and the like.

The working device 3 has a working portion 3a for performing the work and a frame 3b for supporting the working portion 3a. In FIG. 11, an example in which a tilling device is attached is shown. The working device 3 is not limited to the example described above and may be of any type.

As shown in FIG. 1 and FIG. 11, the working device 3 is provided with a communication device (hereinafter referred to as a first communication device) 10. For example, the first communication device 10 is attached to the frame 3b of the working device 3. Further, on the side of the tractor 2 (vehicle body 4), a receiving device 11 is provided. For example, the receiving device 11 is attached to the rear portion of the cabin 9.

It should be noted that the receiving device 11 may be attached to the vicinity of the connecting portion 7, the inside of the cabin 9, or the like instead of the rear portion of the cabin 9, and the mounting portion of the receiving device 11 is not limited to the example described above.

The first communication device 10 is a device that outputs device information on the working device 3 to the outside with a beacon that is a broadcast signal. The first communication device 10 is an active wireless tag, that is, an active type RFID tag. It should be noted that the first communication device 10 may be any device that outputs a beacon, and is not limited to an active type RFID tag.

As shown in FIG. 1, the first communication device 10 has a storage part 10a, a power supplying part 10b, and an outputting part (hereinafter referred to as a first outputting part) 10c. The storage part 10a is composed of a nonvolatile memory or the like, for example, and stores the identifying information for identifying the working device 3 as the device information.

As shown in FIG. 1, the first communication device 10 has the storage part 10a, a power supplying part 10b, and an outputting part 10c. The storage part 10a is composed of a nonvolatile memory or the like, for example, and stores the identifying information for identifying the working device 3 as the device information.

In the above description, the device information includes the identifying information for identifying the working device 3, but may include information other than the identifying information.

The power supplying part 10b is, for example, a primary battery such as a dry battery, a button battery, a solar battery, or the like. The power supplying part 10b is connected to the first outputting part 10c and the like, and supplies electric power to the first outputting part 10c.

The first outputting part 10c is a communication module that outputs a beacon, and outputs a beacon including the identifying information stored in the storage part 10a to the outside at predetermined intervals, for example, at intervals of several seconds. The distance (output distance) of the beacon outputted from the first outputting part 10c is set to, for example, several tens of centimeter to several tens of meters.

In addition, the first communication device 10 may have an inertial force detecting part 10d. The inertial force detecting part 10d is an acceleration sensor or the like. The inertial force detecting part 10d and the first outputting part 10c are connected, and the first outputting part 10c is operated by a signal from the inertial force detecting part 10d.

For example, when the acceleration sensor detects the vibration of the working device 3 continuously for a predetermined time (for example, several seconds to several tens of seconds) or more, the first outputting part 10c determines that the working device 3 is operating (driven) and outputs a beacon. After outputting the beacon, the first outputting part 10c continues to output the beacon while the vibration of the working device 3 continues continuously.

On the other hand, for example, when the vibration of the working device 3 stops continuously for a predetermined time (for example, several seconds to several tens of seconds), the first outputting part 10c determines that the operation of the working device 3 is stopped and stops the output of the beacon.

Thus, in the case where the inertial force detecting portion 10d is provided in the first communication device 10, since the beacon can be output to the outside only in the state in which the working device 3 is operating, the consumption of electric power in the power supply portion 10b can be suppressed.

The receiving device 11 is a device that receives a beacon outputted from the first communication device 10. The receiving device 11 includes a receiving part 11a and an outputting part (hereinafter referred to as a second outputting part) 11b. The receiving part 11a is a communication module that receives a beacon and receives beacons at predetermined intervals.

The second outputting part 11b outputs the device information included in the beacon received by the receiving part 11a to the in-vehicle network N1 such as CAN, LIN, FlexRay, and the like provided in the vehicle body 2.

As shown in FIG. 1, a plurality of devices 12 are mounted on the vehicle body 2 of the tractor 2 separately from the receiving device 11. The devices 12 are devices constituting the tractor 2, and include, for example, a detecting device 12a, a switch device 12b, a display device 12c, a control device 12d, and a communication device (hereinafter referred to as a second communication device) 12e.

The detecting device 12a is a device for detecting the operation state of the tractor 2 and includes an accelerator pedal sensor, a shift lever detection sensor, a crank position sensor, a fuel sensor, a water temperature sensor, an engine revolution sensor, a steering angle sensor, an oil temperature sensor, an axle revolution sensor, a cover sensor (till depth sensor), a PTO revolution sensor, and the like. The switch device 12b is a device that performs the switching, and is an ignition switch, a parking brake switch, a PTO switch, or the like.

The display device 12c is a device for displaying various items related to the tractor 2, and is a liquid crystal type display device composed of liquid crystal or the like. The display device 12c is disposed in front of or in the side of the operator seat 8. The display device 12*c* displays, for example, the engine speed, the gear shift stage, the water temperature, the fuel, and the like. The information displayed on the display device 12*c* is not limited to the example described above.

The control device 12*d* is a device for controlling the tractor and is a CPU or the like. The second communication device 12*e* is a device that communicates with the outside of the tractor 2 separately from the receiving device 11.

The plurality of devices 12 and the receiving device 11 are connected by the in-vehicle network N1 To the vehicle communication network N1, a detection signal (detection value) detected by the detecting device 12*a*, a switch signal indicating switching of the switch device, an operation portion (for example, an engine, a solenoid valve, a pump, and the like). the device information received by the receiving device 11, and the like are outputted.

The control device 12*d* includes a first control device 12*d*1 and a second control device 12*d*2. The first control device 12*d*1 is a device that controls the whole of the tractor 2. The first control device 12*d*1 receives a detection value detected by the detecting device 12*a* (for example, an operation amount of the accelerator pedal, a shift lever position (gear position) at the time of operating the shift lever, an engine revolution speed, a gear position, an oil temperature, a crank angle position, cam position, and the like] are inputted.

The first control device 12*d*1 outputs a control command to the second control device 12*d*2 so that the engine reaches a predetermined revolution speed based on the operation amount of the accelerator pedal and controls the transmission device 6 based on the shift lever position (Shift control). Further, the first control device 12*d*1 controls elevation of the three-point link mechanism 7 based on an input from the operation member (up/down control).

The second control device 12*d*2 is a device that mainly controls the engine 3. The second control device 12*d*2 controls the injector, the common rail, the supply pump, and the like based on the input of the operation amount of the accelerator pedal, the crank position, the cam position, and the like.

In the engine control of the second control device 12*d*2, for example, the fuel injection amount, the injection timing, and the fuel injection rate are set in the control of the injector, and in the control of the supply pump and the common rail, the fuel injection pressure is set.

The second communication device 12*e* includes a communication part (a transmitting part) 12*e*1, a collecting part 12*e*2, an relating part 12*e*3, and a storage part 12*e*4.

The communicating part 12*e*1 is a device that performs the short distance communication or the long distance communication and can be connected to external devices. For example, the communicating part 12*e*1 is a communication module that performs wireless communication using the Wi-Fi (Wireless Fidelity (a registered trademark)) of the IEEE 802.11 series, which is a communication standard. Note that the communicating part (tel may be a communication module that performs wireless communication via a cellular phone communication network or a communication module that performs wireless communication via a data communication network.

The collecting part 12*e*2 sequentially collects the first operation information [detection signal (detection value), switch signal] of the device 12 when the device 12 is operated (when the engine is driven). The collecting part 12*e*2 collects the operation amount of the accelerator pedal, the gear position, the engine speed, the steering angle, the vehicle speed, the tilling depth, and the PTO revolution number as the first operation information of the device 12. It should be noted that the first operation information acquired by the collecting part 12*e*2 is not limited to the example described above.

The relating part 12*e*3 associates the first operation information collected by the collecting part 12*e*2 with the identifying information included in the device information.

Figure 2:
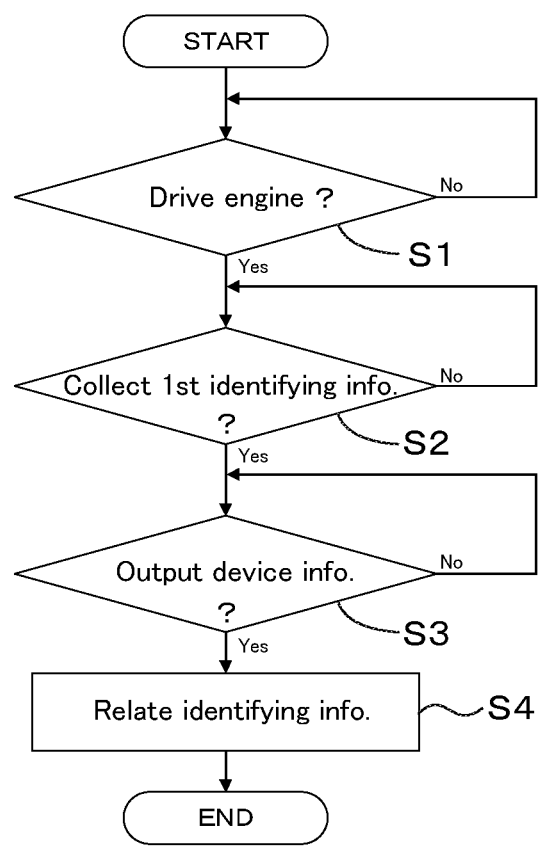
FIG. 2 is a view illustrating an operational flow of a relating part according to the first embodiment.

As shown in FIG. 2, the relating part 12*e*3 judges, for example, whether the engine of the tractor 2 is driven or not (step S1).

When the engine is being driven (step S1, Yes), the relating part 12*e*3 determines whether collection of the first operation information by the collecting part 12*e*2 is started (step S2, Yes).

When collection of the first operation information is started by the collecting part 12*e*2 (step S 2, Yes), the relating part 12*e*3 determines whether the device information has been output from the receiving device 11 to the in-vehicle network N1 (step S3).

As shown in FIG. 2, when the device information is outputted to the in-vehicle network N1 (step S3, Yes), the relating part 12*e*3 associates the first operation information collected by the collecting part 12*e*2 with the identifying information (step S4).

The associated first operation information and identifying information are stored in the storage part 12*e*4 configured with a nonvolatile memory or the like. The first operation information and the identifying information associated by the relating part 12*e*3 are displayed on the display device 12*c*.

Note that the communicating part 12*e*1 of the second communication device 12*e* transmits the first operation information and the identifying information to the outside, and the communication terminal (the mobile terminal) 13 may display the first operation information and the identifying information transmitted from the communicating part 12*e*1.

Specifically, the communication terminal (mobile terminal) 13 is configured with, for example, a smartphone (a multi-function mobile phone) having comparatively high calculation capability, a tablet PC, and the like. The communication terminal 13 includes a communicating part 13*a* that acquires information outputted from the communicating part 12*e*1 of the second communication device 12*e*, and a display part 13*b*.

The communicating part 13*a* is a communication module that performs wireless communication by the Wi-Fi (Wireless Fidelity (a registered trademark)) of the IEEE 802.11 series, which is a communication standard. Note that the communicating part 13*a* may be a communication module that performs wireless communication via a cellular phone communication network or a communication module that performs wireless communication via a data communication network.

The display part 13*b* is a liquid crystal panel or the like, and can display information received by the communicating part 13*a*, for example, first operation information and identifying information.

According to the above embodiment, the communication system of the working machine includes the first communication device 10 and the receiving device 11. Thus, by simply bringing the working device 3 corresponding to the work close to the rear portion of the tractor 2 (the vehicle body 4), the receiving device 11 can obtain the device information such as the identifying information (a machine type, a model number, and the like) of the working device 3 transmitted to the outside by the first communication device 10 with the beacon.

That is, when the working device 3 is attached to the rear portion of the tractor 2 (the vehicle body 4), the device information of the working device 3 (hereinafter, occasionally referred to as the mounting device) that has been installed is transmitted to the tractor 2 side, and on the tractor 2 side, the receiving device 11 can receive the device information of the mounting device 3.

That is, the device information of the mounting device 3 can be obtained in the beacon, and the operator can confirm what kind of the working device 3 is mounted on the tractor 2.

The first communication device 10 has a first outputting part 10c and the receiving device 11 has a second outputting part 11b. Thus, it is possible to take in the device information of the mounting device 3 to the in-vehicle network N1 of the tractor 2 and utilize the taken-in device information. For example, it is possible to display the device information and the like of the mounting device 3 on the display device 12c or the like mounted on the tractor 2.

The communication system of the working machine includes a second communication device 12e. Thus, it is possible to output the device information of the mounting device 3 to the outside after passing through the in-vehicle network N1 of the tractor 2. Thus, while the tractor 2 utilizes the device information of the mounting device 3, the external device (an external apparatus) can also acquire the device information.

Further, the second communication device 12e has a collecting part 12e2 and a relating part 12e3. Thus, it is possible to associate the operation information (the first operation information) obtained when the tractor 2 is operated with the working device (mounting device) 3 mounted on the tractor 2.

That is, by associating the operation information of the tractor 2 with the mounting device 3, it is possible to appropriately grasp the operating state when the work is performed by the mounting device 3 while being pulled by the tractor 2.

Second Embodiment

Figure 3:
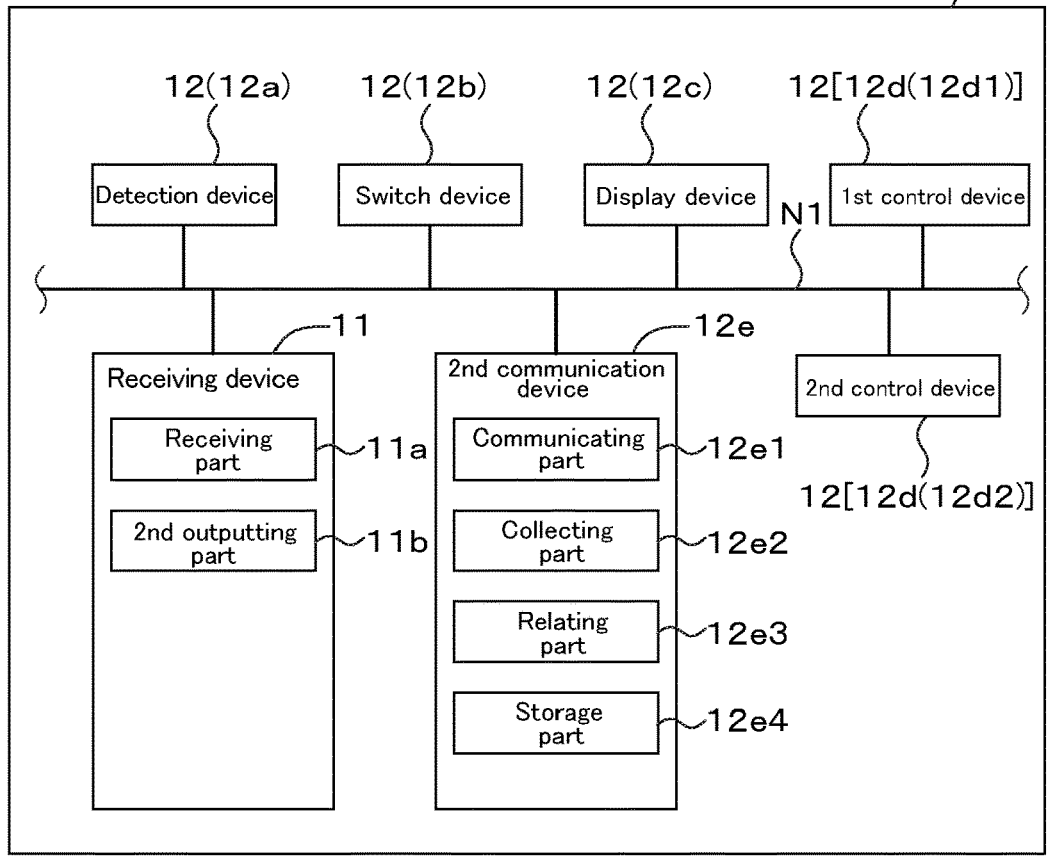
FIG. 3 is a view illustrating an outline of a communication system for a working machine according to a second embodiment of the present invention.
Figure 3:
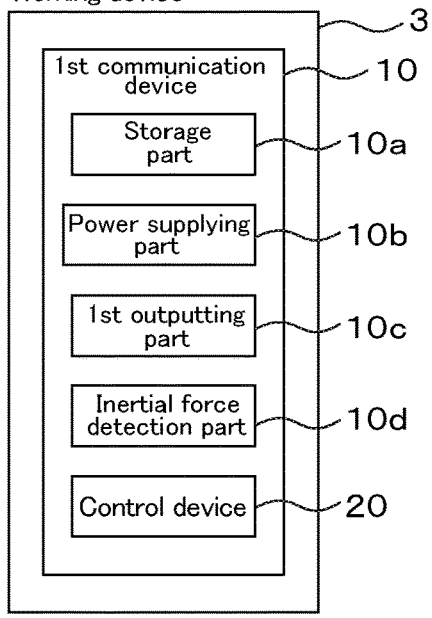
Figure 3:
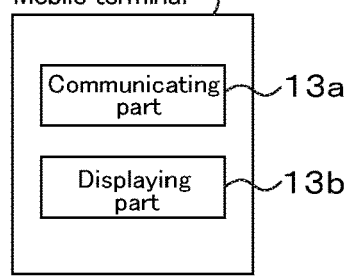

FIG. 3 shows the entire communication system of the working machine of the second embodiment. In the communication system of the working machine according to the second embodiment, the first communication device 10 transmits the operation information (hereinafter referred to as the second operation information) of the working device 3 to the outside in the beacon as the device information of the working device 3. In the second embodiment, the descriptions of the same configuration as those of the first embodiment will be omitted.

First, the working device 3 will be described.

Figure 4:
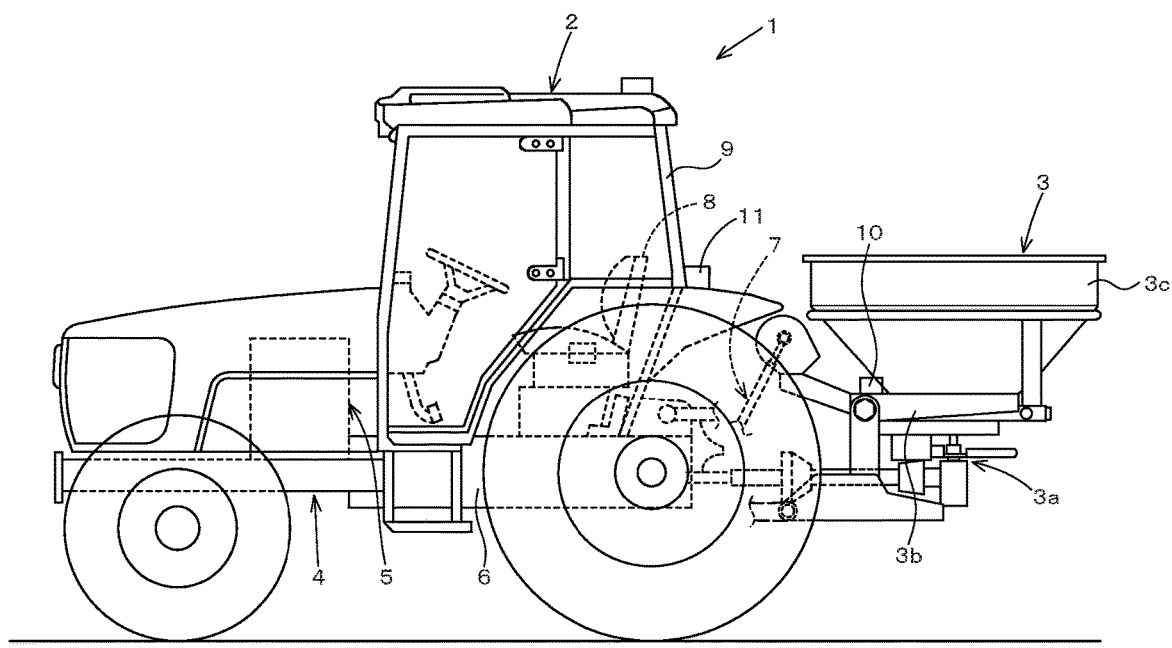
FIG. 4 is a whole view of the working machine in which a fertilizing device is coupled to a tractor according to the second embodiment.

As shown in FIG. 4, the working device 3 is a fertilizer spraying device for spraying fertilizer. The working device 3 includes a container 3c capable of storing the spraying agent and a working portion 3a provided in the container 3c and spraying the spraying agent in the container 3c to the outside. The working portion 3a is constituted of, for example, an openable and closable shutter and the like, and it is possible to disperse the application agent by the opening/closing operation of the shutter.

As shown in FIG. 3, the working device 3 includes a control device 20 that controls the working portion 3a. For example, the control device 20 controls the opening/closing timing of the shutter, the opening degree (opening degree) of the shutter, and the like in the working portion 3a.

The first outputting part 10c of the first communication device 10 is connected to the control device 20 that controls the working device 3. When the working device 3 is driven, the first output portion 10c acquires the operation information (hereinafter referred to as second operation information) of the working device 3 from the control device 20.

In this embodiment, the second operation information is the opening degree of the shutter and the timing of opening/closing the shutter. Note that the control device 20 may obtain the spraying amount (fertilizing amount) based on the opening degree of the shutter and the timing of opening and closing the shutter, and the amount of application of fertilizer may be set as the second operating information.

When the working device 3 is driven, the first output portion 10c outputs the beacons including the identifying information and the second operation information stored in the storage portion 10a to the outside at predetermined intervals. That is, the first outputting part 10c outputs the device information including the second operation information and the identifying information of the working device 3 to the outside.

The receiving part 11a of the receiving device 11 receives the second operation information and the identifying information outputted by the first outputting part 10c of the first communication device 10 in a state in which the predetermined working device 3 is attached to the tractor 2. The second outputting part 11b of the receiving device 11 outputs the second operation information and the identifying information included in the beacon received by the receiving part 11a to the in-vehicle network N1. The display device 12c displays the second operation information and the identifying information outputted to the in-vehicle network N1.

In addition, the collecting part 12e2 of the second communication device 12e sequentially collects the first operation information of the device 12 and the second operation information outputted to the in-vehicle network N1. As shown in FIG. 5A, for example, the collecting part 12e2 collects the engine revolution speed rpm, the vehicle speed km/h, and the PTO revolution speed rpm as the first operation information.

As shown in FIG. 5B, the collecting part 12e2 collects the fertilizer amount kg/a as the second operation information. The relating part 12e3 associates the first operation information, the second operation information, and the identifying information collected by the collecting part 12e2.

For example, when the engine of the tractor 2 is driven, the collecting part 12e2 collects the first operation information and the second operation information, and the identifying information exists in the in-vehicle network N1, the relating part 12e3 associates the first operation information, the second operation information, and the identifying information.

For example, as shown in FIG. 5C, the relating part 12e3 associates the engine speed rpm, the vehicle speed km/h and the PTO revolution speed rpm, which are the first operation information, the fertilization amount kg/a which is the second operation information, and "K-1150" as the identifying information.

The communicating part 12e1 of the second communication device 12e transmits the first operation information, the second operation information, and the identifying information associated by the relating part 12e3 to the outside. In the above-described embodiment, the first operation information and the second operation information are associated with each other, and the associated first operation information and the second operation information are transmitted to the outside, but instead of that, the second communication device 12e of the communicating part 12e1 may transmit the second operation information and the identifying information to the outside.

In the communication system of the working machine in this embodiment, the relating part 12e3 of the second communication device 12e associates the first operation information of the tractor 2 with the second operation information of the mounting device 3. Thus, when the work is performed by the mounting device 3 while being pulled by the tractor 2, it is possible to simultaneously grasp the operating state of the tractor 2 and the operating state of the mounting device 3.

Third Embodiment

Figure 6:
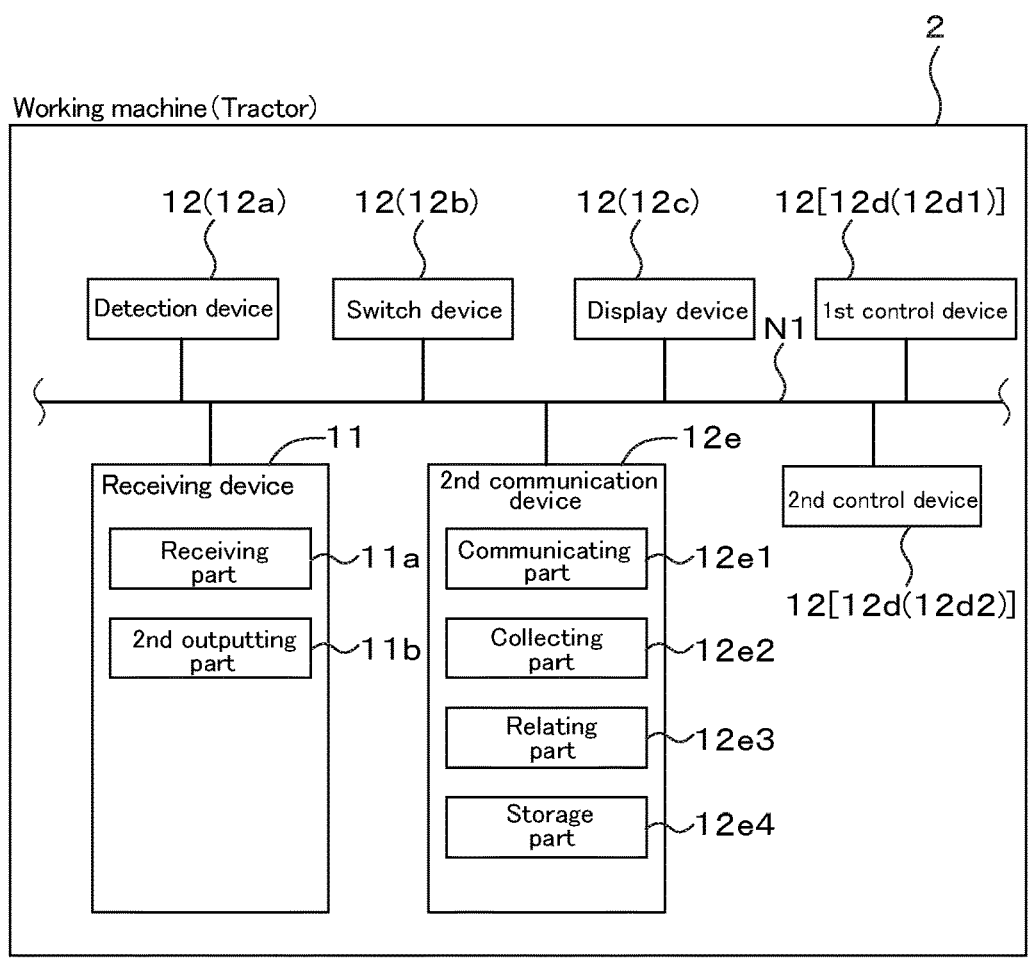
FIG. 6 is a view illustrating an outline of a communication system for a working machine according to a third embodiment of the present invention.
Figure 6:
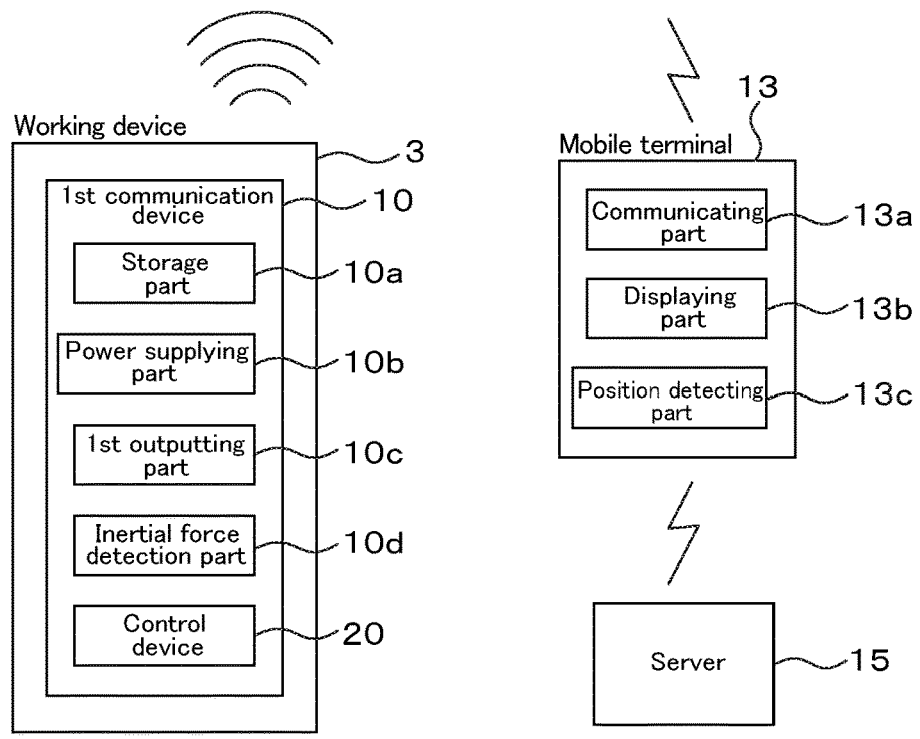

FIG. 6 shows the entire communication system of the working machine of the third embodiment. In the communication system of the working machine according to the third embodiment, the device information and the like transmitted to the outside by the second communication device 12e are used for the working performance of the working machine.

In the third embodiment, a description of the same configuration as that of the first embodiment or the second embodiment is omitted. The configuration of the third embodiment can be applied to either the first embodiment or the second embodiment. Further, all of the above-described embodiments may be combined.

As shown in FIG. 6, the communication system of the working machine includes a server 15 and a communication terminal (portable terminal) 13. The communication terminal 13 includes a communicating part 13a, a display part 13b, and a position detecting part 13c.

The communicating part 13a is connectable to the second communication device 12e and the server 15. The display part 13b is the same as the above-described embodiment. The position detecting part 13c detects a position (for example, the longitude, the latitude) based on a signal of a positioning satellite such as the GPS.

According to the communication terminal 13, if the communication terminal 13 is connected to the second communication device 12e, it is possible for the communicating part 13a to acquire the identifying information. The communicating part 13a of the communication terminal 13 transmits the acquired identifying information to the server 15 together with the position (hereinafter referred to as the position information) detected by the position detecting part 13c.

In addition to the identifying information and the position information, the communicating part 13a may also transmit the first operation information and/or the second operation information to the server 15.

The server 15 is capable of acquiring various information transmitted from the communication terminal 13. The server 15 stores various pieces of information received from the communication terminal 13 as the working results. For example, as shown in FIG. 7A, when receiving the identifying information and the position information transmitted by the communication terminal 13, the server 15 stores the identifying information and the position information as the working record.

In this case, it is possible to reliably ascertain from which position the working device 3 indicated by the identifying information has performed the working in the field. In particular, the identifying information is "Output from the first communication device 10 of the working device 3"→"Receive by the receiving device 11 of the tractor 2 to which the working device 3 is attached"→"Output by the receiving device 11"→"Receive by the second communication device 12e"→"Output by the second communication device 12e"→"Receive by the server 15 via the communication terminal 13".

Thus, it is possible to prove that the predetermined working device 3 has been towed by the predetermined tractor 2 and performed the working, with the fact that the identifying information is stored in the server 15, thereby improving the reliability of the working record.

Alternatively, as shown in FIG. 7B, when receiving the first operation information, the identifying information, and the position information, the server 15 stores the first operation information, the identifying information, and the position information as the working record. In this case, it is possible to reliably ascertain which work has been performed in which field in the working device 3 indicated by the identifying information and the tractor 2 towing the working device 3.

In addition to the identifying information, the first operation information also reaches the server 15 via the second communication device 12e mounted on the predetermined tractor 2. Thus, it is possible to prove that the predetermined tractor has towed the predetermined working device 3 to perform the working with the fact that the identifying information and the first operation information corresponding to the identifying information are stored in the server 15, thus the reliability of the working record can be improved.

Alternatively, as shown in FIG. 7C, when receiving the first operation information, the second operation information, the identifying information and the position information, the server 15 transmits the first operation information, the second operation information, the identifying information and the position information as the working results.

Also in this case, it is possible to reliably ascertain which work has been performed in which field in the working device 3 indicated by the identifying information and the tractor 2 towing the working device 3. Particularly, since the second operation information in the case where the working device 3 is operated is also stored in the server 15 as the working record, the work of the working device 3 can be analyzed and organized in detail.

In the above-described embodiment, the position detecting part 13c is provided in the communication terminal 13. Alternatively, the second communication device 12e may have the same configuration as that of the position detecting part 13c. In this case, the second communication device 12e also transmits the position information when transmitting the identifying information and the operation information (the first operation information, the second operation information) to the communication terminal 13.

Further, the second communication device 12e may transmit the identifying information, the operation information (the first operation information, the second operation information) and the position information to the server 15 through the cellular phone communication network or the data communication network.

Fourth Embodiment

Figure 8:
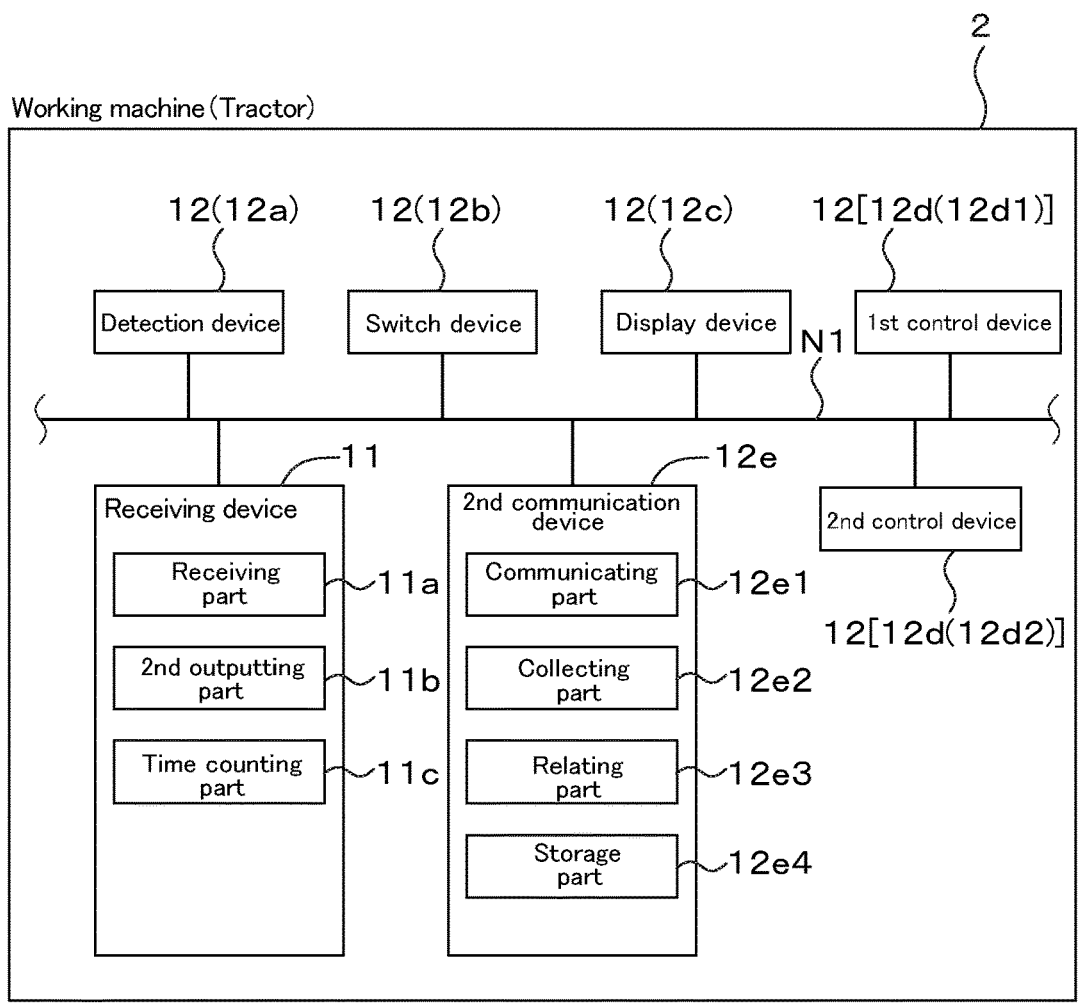
FIG. 8 is a view illustrating an outline of a communication system for a working machine according to a fourth embodiment of the present invention.

FIG. 8 shows the entire communication system of the working machine of the fourth embodiment. In the communication system of the working machine according to the fourth embodiment, the operation time of the working device 3 is obtained based on the beacon (broadcast signal) transmitted from the first communication device 10 to the outside.

In the fourth embodiment, descriptions of configurations similar to those of the first to third embodiments are omitted. The configuration of the fourth embodiment can be applied to any of the first to third embodiments. Further, all of the above-described embodiments may be combined.

As shown in FIG. 8, the receiving device 11 includes a time calculating part 11c. The time calculating part 11c obtains the time at which the device information was acquired for each identifying information. Specifically, as shown in FIG. 9A, it is assumed that the receiving device 11 continuously receives the identifying information indicated by "K-1150" during the period from time T1 to time T2. The time calculating part 11c sets the elapsed time from the time T1 to the time T2 to the time (hereinafter referred to as the operation time) to acquire the identifying information (the device information).

The time calculating part 11c stores the first operation time of the identifying information. Also, when the receiving device 11 consecutively enters the identifying information indicated by "K-1150" between the time T3 and the time T4, the time calculating portion 11c calculates the elapsed time from the time T3 to the time T4 as the second operating time.

Further, the time calculating part 11c calculates the cumulative operation time that the receiving device 11 has received the identifying information for each identifying information. For example, the time calculating part 11c calculates the cumulative time in "K-1150" by adding the first operating time and the second operating time when the receiving device 11 acquired "K-1150".

That is, the time calculating part 11c calculates the cumulative time of the same identifying information by totaling a plurality of operation times corresponding to the same identifying information. The cumulative time obtained by the time calculating part 11c is stored in the storage part 11d provided in the receiving device 11 in association with the identifying information.

The second outputting part 11b of the receiving device 11 outputs the cumulative time obtained by the time calculating part 11c to the in-vehicle network N1 together with the identifying information corresponding to the cumulative time.

As shown in FIG. 9A, the time calculating part 11c sets the time (elapsed time) when the receiving device 11 receives the beacon as the operation time of the operation device 3. Thus, even if there is no hour meter in the working device 3, that is, no device for obtaining the accumulated operating time, the accumulated operating time of the working device 3 can be grasped based on the beacon.

It should be noted that the time calculating part 11c determines whether or not the prime mover 5 is driven based on the signal from the detecting device 12a and determines the time during which the prime mover 5 is driven and the receiving device 11 acquires the identifying information as the operation time. That is, the time calculating part 11c may not include, into the operating time, the time during which the receiving device 11 acquires the identifying information under the state in which the prime mover 5 is not driven.

Alternatively, the time calculating part 11c determines whether or not the PTO axis is driven based on the signal from the detecting device 12a or the switch device 12b. The time when the PTO axis is driven and the receiving device 11 acquires the identifying information may be an operating time. That is, the time calculating part 11c may not include, into the operating time, the time during which the receiving device 11 acquires the identifying information while the PTO axis is not being driven.

As described above, in the case where the time calculating part 11c determines the time during which the prime mover 5 is driven and the receiving device 11 obtains the identifying information or the time when the PTO axis is driven and the receiving device 11 acquires the identifying information is set as the operation time, it is possible to make the time actually to be driven by the working device 3 coincide with the operating time obtained by the time calculating portion 11c, and thereby it is possible to more accurately obtain the accumulated operating time of the working device 3.

Further, as shown in FIG. 9B, in attaching the working device 3 to the rear portion of the tractor 2, there is a case where the receiving device 11 temporarily receives the identifying information another working device 3 (another working device 3 different from the working device 3 to be mounted) close to the tractor 2.

In this case, the time calculating part 11c employs the identifying information consecutively received for the longest time among the plurality of pieces of identifying information received by the receiving device 11 within a predetermined time (for example, several minutes to several tens of minutes).

Alternatively, in the case where the receiving device 11 receives a plurality of pieces of identifying information, the time calculating part 11c may employ the identifying information of the beacon whose radio wave intensity is equal to or higher than a predetermined value, excluding the beacon whose received radio wave intensity is less than the predetermined value.

As shown in FIG. 9B, when a plurality of beacons (the identifying information) is received, the identifying information continuously received for the longest time is employed or a beacon in which the radio wave intensity is equal to or higher than a predetermined value is employed, and thus the accumulated operating time of the working device 3 can be obtained more accurately.

In the first to fourth embodiments, the beacon outputted from the first communication device 10 provided in the working device 3 is received by the receiving device 11. However, the beacon output from the first communication device 10 may be received by the communication terminal 13.

That is, the communicating part 13a of the communication terminal 13 may be provided with a function of receiving the device information transmitted by the beacon. The configuration for receiving a beacon in the communicating part 13a is the same as that of the receiving part 11a of the receiving device 11.

Therefore, by simply bringing the communication terminal 13 closer to the work device 3, the worker or the like can grasp just what type and model number of the work device 3 is, just by looking at the display part 13b of the communication terminal 13. For example, at a storage location where the working device 3 is stored, a predetermined working device 3 corresponding to the operation may be selected from a plurality of working devices 3 and mounted on the tractor 2.

Under such circumstances, even if there are working devices 3 with different model numbers or the like whose appearances are similar, there is a possibility that the worker erroneously installs the working device 3 not suitable for the working. However, as described above, since the machine type and the model number are displayed on the communication terminal 13, it is possible to prevent the working device 3 not suitable for the work from being attached to the tractor 2.

Figure 10A:
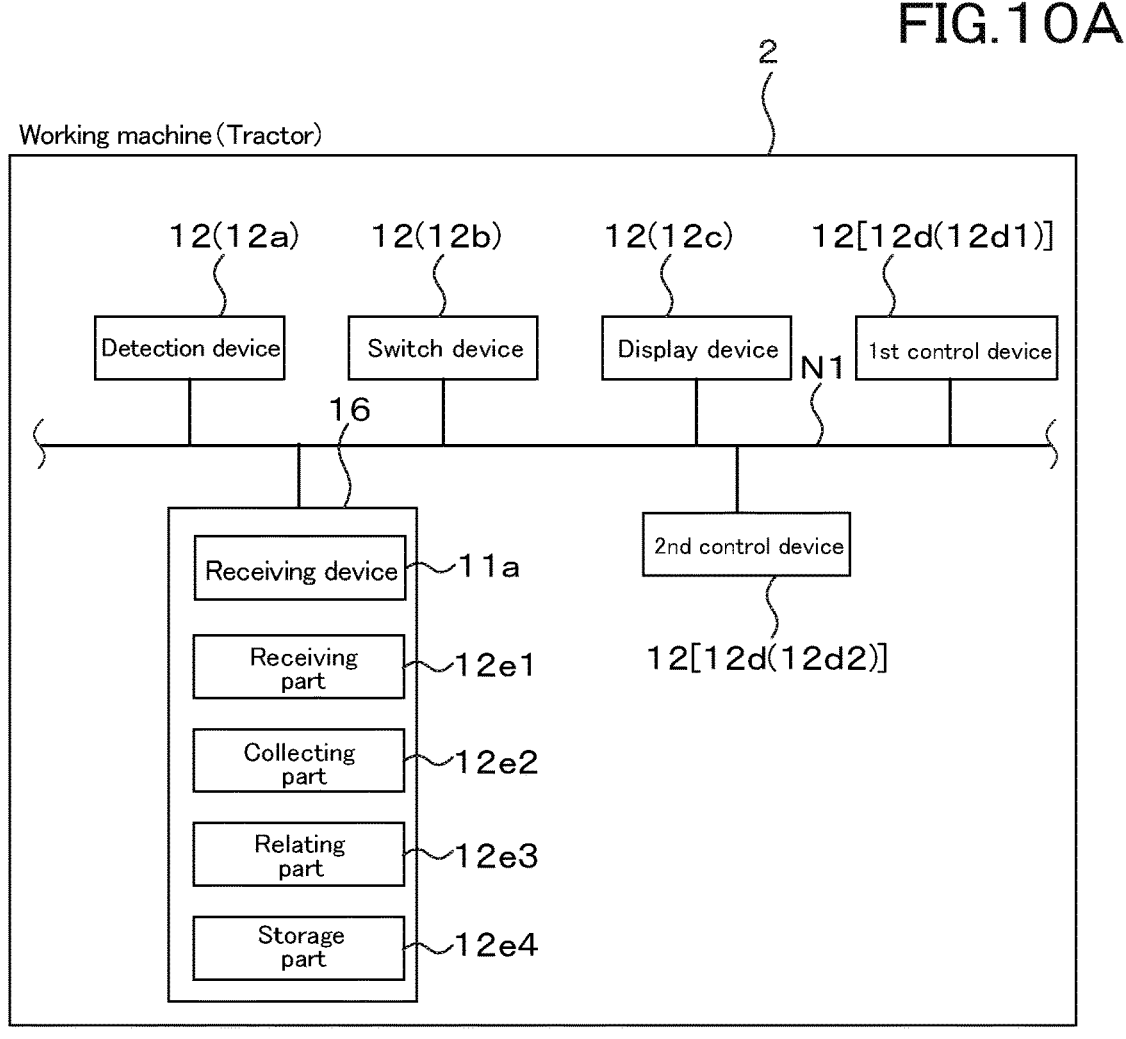
FIG. 10A is a view illustrating a communication system for a working machine constituted by integrating a receiving device and a first communication device according to the fourth embodiment.
Figure 10A:
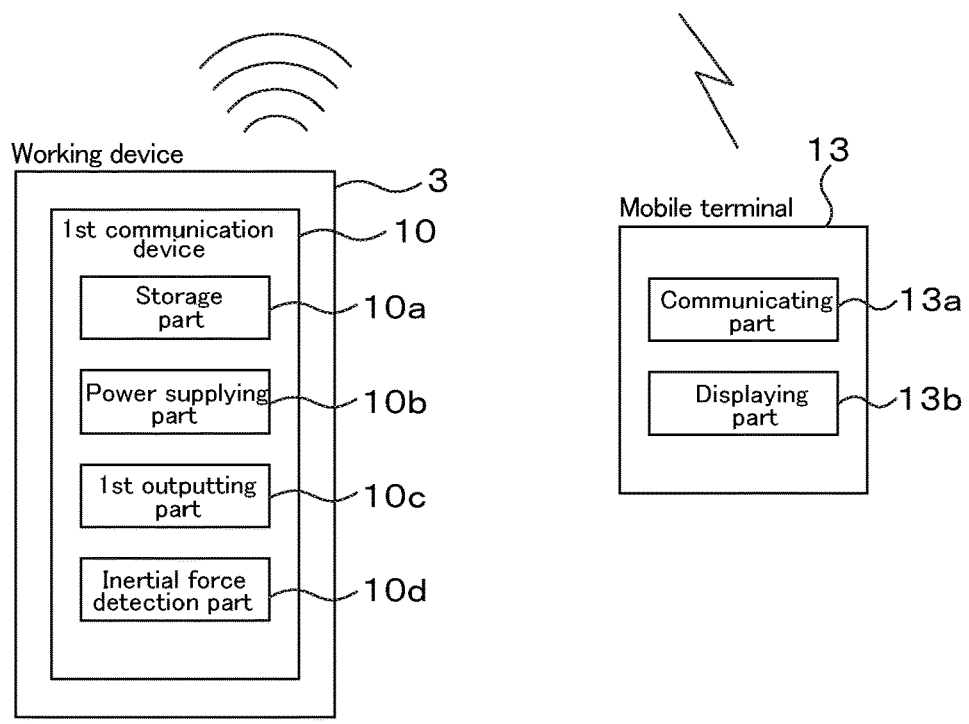

In the above-described embodiment, the receiving device 11 and the first communication device 10 are configured separately. However, the receiving device 11 and the first communication device 10 may be integrated. For example, as shown in FIG. 10A, provided may be a device 16 in which the receiving part 12*a* of the receiving device 11, the communicating part 12*e*1 of the first communication device 10, the collecting part 12*e*2, the relating part 12*e*3, and the storage part 12*e*4 are integrated.

Figure 10B:
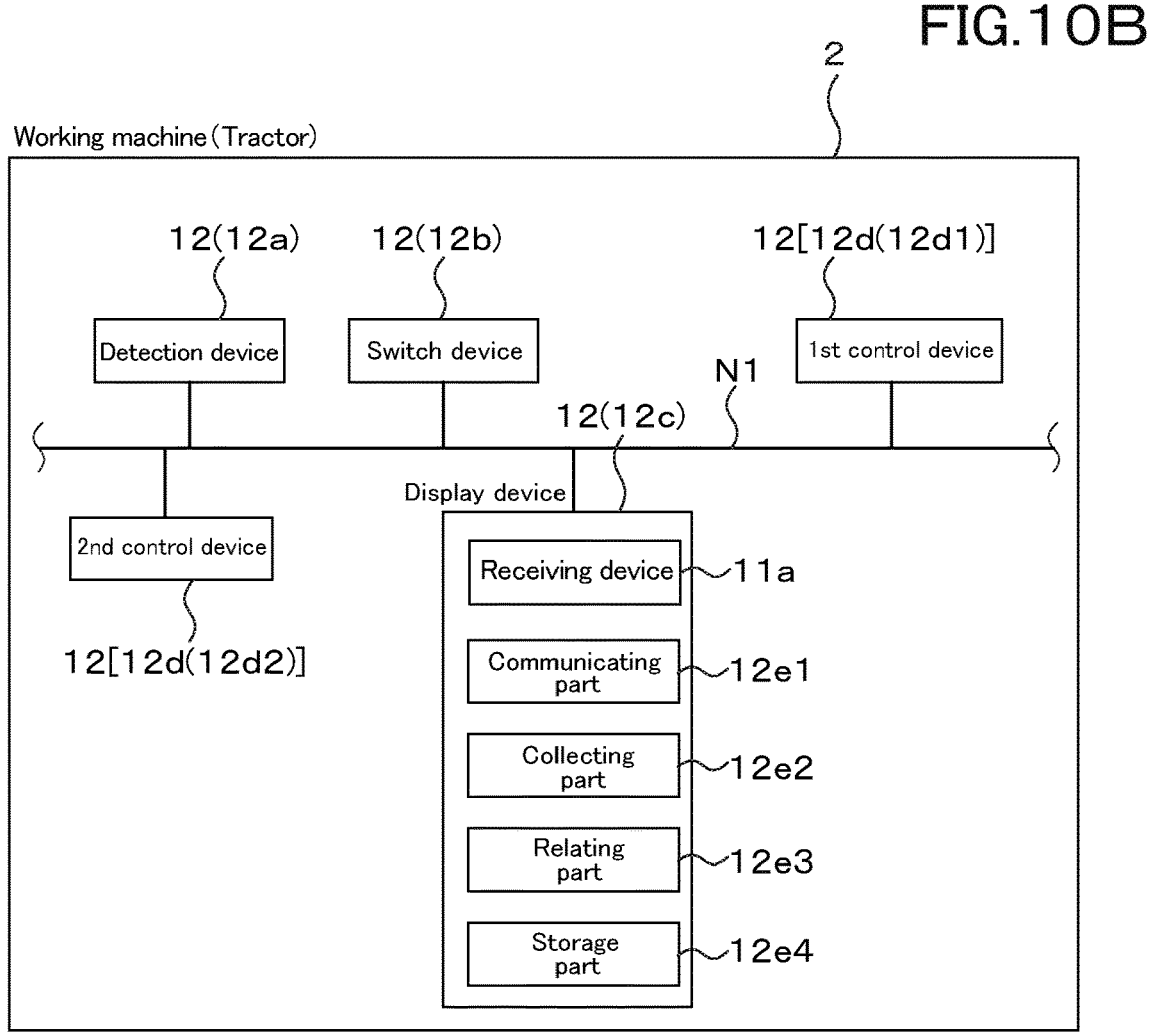
FIG. 10B is a view illustrating a communication system for a working machine constituted by integrating the receiving device, the first communication device, and a displaying device according to the fourth embodiment.
Figure 10B:
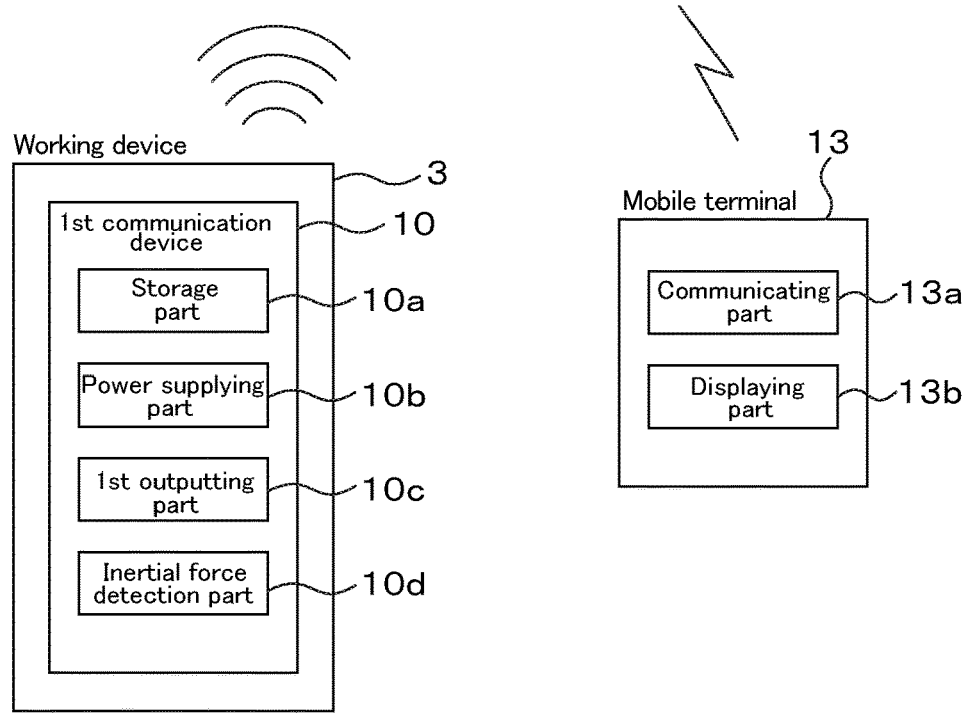

Further, as shown in FIG. 10B, the functions of the receiving device 11 and the first communication apparatus 10, that is, the receiving part 12*a* of the receiving device 11, the communicating part 12*e*1 of the first communication apparatus 10, the collecting part 12*e*2, the relating part 12*e*3, and the storage part 12*e*4 may be provided in the display device 12*c*.

In this case, the display device 12*c* can display the second operation information. In a case where the second operation information (the information output from the first outputting part 10*c* of the first communication device 10) is, for example, inclination data indicating the inclination of the working device 3, the display device 12*c* can display the inclination.

Further, when the inclination of the working device 3 is displayed on the display device 12*c*, the worker or the like can grasp the inclination of the working device 3. In addition, the display device 12*c* displays an inputting part for inputting a control value for controlling the working device 3, for example, an inputting part for inputting the inclination of the connecting unit 7, so that the worker can change the input value to the inputting part while watching the inclination of the working device 3 displayed on the display device 12*c*, and thereby corrects the inclination of the working device 3.

In the embodiment described above, the second operation information has been described with the inclination of the working device 3 as an example. However, the second operation information is not limited to the inclination of the working device 3, and other data may be used. That is, in the modification example of FIG. 10B, the receiving device 11, the first communication device 10, and the display device 12*c* are integrated, and the information outputted from the first outputting part 10*c* of the first communication device 10 is displayed on the display device 12*c*, and thereby the working device 3 can be corrected by providing the inputting part on the display device 12*c*.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A communication system for a working machine, the working machine comprising a work vehicle and a working device detachably disposed on the work vehicle,
the communication system comprising:
a first communication device attached to the working device and configured to transmit a beacon containing device information which relates to the working device and includes identifying information identifying the working device; and
a receiving device provided on the work vehicle and configured to receive the beacon;
a second communication device provided on the work vehicle and connected to the receiving device, the second communication device being configured to transmit the device information to a mobile terminal,
wherein the mobile terminal is configured to detect position information thereof and to transmit, to a server, the device information transmitted from the second communication device along with the position information.

2. The communication system for the working machine according to claim 1,
wherein the first communication device has a first outputting part configured to transmit the identifying information,
and wherein the receiving device has a second outputting part connected to an in-vehicle network of the work vehicle and configured to output, to the in-vehicle network, the identifying information received by the receiving part.

3. The communication system for the working machine according to claim 2, wherein the second communication device is connected to the in-vehicle network and is configured to obtain the identifying information outputted by the second outputting part,
wherein the second communication device has a transmitting part configured to transmit the identifying information to the mobile terminal.

4. The communication system for the working machine according to claim 3,
wherein the second communication device has a collecting part configured to collect a first operation information of a device mounted on the vehicle,
and wherein the transmitting part transmits the first operation information and the identifying information to the mobile terminal.

5. The communication system for the working machine according to claim 4,
wherein the first outputting part broadcasts the identifying information and second operation information of the working device,
wherein the receiving part receives the second operation information of the working device,
wherein the collecting part collects the first operation information and the second operation information,
and wherein the transmitting part transmits, to the mobile terminal, the first operation information, the second operation information, and the identifying information.

6. The communication system for the working machine according to claim 4,
wherein the second communication device has a relating part configured to relate the identifying information to the first operation information collected by the collecting part.

7. The communication system for the working machine according to claim 1, comprising a display device configured to obtain the identifying information received by the receiving part and to display the obtained identifying information.

8. The communication system for the working machine according to claim 1, comprising a time calculating part configured to calculate a cumulative time when having obtained each of the identifying information.

9. The communication system for the working machine according to claim 1, comprising a time calculator provided on the work vehicle and configured to calculate an operation time while the receiving device receives the beacon from the first communication device.

10. The communication system according to claim 1,
wherein the first communication device is configured to transmit the beacon containing first operation information of the working device, and
wherein the second communication device is configured to collect second operation information of the work vehicle, and to transmit the beacon containing the device information including the first operation information and the second operation information.

11. The communication system for the working machine according to claim 1, further comprising an inertial force detector attached to the working device and configured to detect vibration of the working device during operation thereof,
wherein the first communication device is configured to transmit the beacon when the inertial force detector detects the vibration of the working device.

12. A communication system for a working machine, the working machine comprising a work vehicle and a working device detachably disposed on the work vehicle,
the communication system comprising:
a first communication device attached to the working device and configured to transmit a beacon containing device information which relates to the working device and includes identifying information identifying the working device;
a receiving device provided on the work vehicle and configured to receive the beacon; and
an inertial force detector attached to the working device and configured to detect vibration of the working device during operation thereof,
wherein the first communication device is configured to transmit the beacon when the inertial force detector detects the vibration of the working device.

13. The communication system according to claim 12,
wherein the first communication device is configured to determine that the working device is operating when the inertial force detector detects the vibration of the working device continuously for a predetermined time or more and to transmit the beacon, and to determine that the working device is stopped when the inertial force detector detects no vibration of the working device continuously for a predetermined time and to stop transmitting the beacon.

14. A communication system for a working machine, the working machine comprising a work vehicle and a working device detachably disposed on the work vehicle,
the communication system comprising:
a first communication device attached to the working device and configured to transmit a beacon containing device information which relates to the working device and includes identifying information identifying the working device;
a receiving device provided on the work vehicle and configured to receive the beacon; and
a time calculator provided on the work vehicle and configured to calculate an operation time while the receiving device receives the beacon from the first communication device.

15. The communication system according to claim 14,
wherein the time calculator is configured to relate the identifying information contained in the beacon to the operation time while the receiving device receives the beacon.

16. The communication system according to claim 14,
wherein when the receiving device receives, within a predetermined time period, a first beacon for a first time and a second beacon for a second time longer than the first time, the time calculator is configured to relate the identifying information contained in the second beacon to the operation time while the receiving device receives the second beacon.

17. The communication system according to claim 14,
wherein when the receiving device receives, within a predetermined time period, a first beacon of for a first intensity and a second beacon of a second intensity greater than the first intensity, the time calculator is configured to relate the identifying information contained in the second beacon to the operation time while the receiving device receives the second beacon.

* * * * *